(12) United States Patent
Sawhney et al.

(10) Patent No.: US 10,275,177 B2
(45) Date of Patent: Apr. 30, 2019

(54) DATA LAYOUT SCHEMAS FOR SEAMLESS DATA MIGRATION

(71) Applicant: Oracle International Corporation, Redwood Shores, CA (US)

(72) Inventors: Aditya Sawhney, Erie, CO (US); Atiq Ahamad, Superior, CO (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/339,299

(22) Filed: Oct. 31, 2016

(65) Prior Publication Data

US 2018/0121129 A1    May 3, 2018

(51) Int. Cl.
*G06F 3/06* (2006.01)

(52) U.S. Cl.
CPC ............ *G06F 3/0647* (2013.01); *G06F 3/061* (2013.01); *G06F 3/0604* (2013.01); *G06F 3/0608* (2013.01); *G06F 3/0659* (2013.01); *G06F 3/0683* (2013.01); *G06F 3/0685* (2013.01)

(58) Field of Classification Search
CPC .... G06F 3/0647; G06F 3/0604; G06F 3/0659; G06F 3/0683
See application file for complete search history.

(56) References Cited

U.S. PATENT DOCUMENTS

| | | | | |
|---|---|---|---|---|
| 5,544,347 | A * | 8/1996 | Yanai | G06F 3/0601 711/162 |
| 6,108,748 | A * | 8/2000 | Ofek | G06F 3/0607 711/100 |
| 6,157,612 | A | 12/2000 | Weerackody et al. | |
| 6,714,553 | B1 | 3/2004 | Poole et al. | |
| 7,035,971 | B1 * | 4/2006 | Merchant | G06F 11/3433 711/112 |
| 7,263,593 | B2 * | 8/2007 | Honda | G06F 3/0605 370/379 |
| 7,707,151 | B1 * | 4/2010 | Blumenau | G06F 3/0617 709/232 |
| 8,521,973 | B2 | 8/2013 | Rowan et al. | |
| 8,645,737 | B2 | 2/2014 | Saika | |

(Continued)

FOREIGN PATENT DOCUMENTS

KR    10-2015-0088531 A    8/2015

*Primary Examiner* — Ryan Bertram
(74) *Attorney, Agent, or Firm* — Invoke

(57) ABSTRACT

Techniques are described for migrating data between storage components. In one or more embodiments, a storage system receives a request to migrate data from a first storage component to a second storage component. Responsive to the request, the storage system initiates migration of the data from the first storage component to the second storage component. While migration is ongoing, the storage system may receive a request to access the data. Responsive to receiving a write request, the storage system executes the write request on the second storage component without executing the write request on the first storage component. Responsive to determining that the second request is a read request, the storage system selects one of the first storage component or the second storage component to execute the read request based on a first attribute associated with the first storage component and/or a second attribute associated with the second storage component.

20 Claims, 7 Drawing Sheets

(56) References Cited

U.S. PATENT DOCUMENTS

| | | |
|---|---|---|
| 8,973,034 B1 | 3/2015 | Harvey et al. |
| 9,037,538 B2 * | 5/2015 | Sampathkumar ..... G06F 3/0617 707/609 |
| 9,396,287 B1 | 7/2016 | Bhave et al. |
| 9,501,507 B1 | 11/2016 | Harris et al. |
| 9,507,843 B1 | 11/2016 | Madhavarapu et al. |
| 9,524,302 B2 | 12/2016 | Regni et al. |
| 9,547,459 B1 | 1/2017 | Benhanokh et al. |
| 9,720,989 B2 | 8/2017 | Theimer et al. |
| 9,798,754 B1 | 10/2017 | Shilane et al. |
| 9,811,529 B1 | 11/2017 | Rus et al. |
| 9,864,774 B2 | 1/2018 | Marcotte |
| 2001/0016843 A1 | 8/2001 | Olson et al. |
| 2002/0143494 A1 | 10/2002 | Conrad |
| 2004/0153458 A1 | 8/2004 | Noble et al. |
| 2006/0072400 A1 | 4/2006 | Anderson et al. |
| 2006/0218558 A1 | 9/2006 | Torii et al. |
| 2006/0271420 A1 | 11/2006 | Anselmann et al. |
| 2007/0239944 A1 * | 10/2007 | Rupanagunta ........ G06F 3/0613 711/147 |
| 2010/0205160 A1 | 8/2010 | Kumar et al. |
| 2010/0257995 A1 | 10/2010 | Kamiya |
| 2010/0322475 A1 | 12/2010 | Ikeda |
| 2011/0013631 A1 | 1/2011 | Frydman et al. |
| 2011/0119100 A1 | 5/2011 | Ruhl et al. |
| 2011/0164614 A1 | 7/2011 | Begeja |
| 2011/0196900 A1 | 8/2011 | Drobychev et al. |
| 2011/0246429 A1 * | 10/2011 | Prahlad ............. G06F 17/30212 707/679 |
| 2012/0072412 A1 | 3/2012 | Bestgen et al. |
| 2012/0311586 A1 | 12/2012 | Inagaki |
| 2013/0311555 A1 * | 11/2013 | Laoutaris ............ H04L 12/6418 709/204 |
| 2013/0326055 A1 | 12/2013 | Chatterjee et al. |
| 2014/0122022 A1 | 5/2014 | Chen et al. |
| 2014/0180461 A1 | 6/2014 | Heck et al. |
| 2014/0280986 A1 | 9/2014 | Baulier et al. |
| 2015/0234897 A1 | 8/2015 | Kuninobu et al. |
| 2015/0278092 A1 | 10/2015 | Smentek et al. |
| 2015/0339314 A1 | 11/2015 | Collins et al. |
| 2015/0355824 A1 | 12/2015 | Ueno |
| 2015/0363271 A1 | 12/2015 | Haustein et al. |
| 2015/0370505 A1 * | 12/2015 | Shuma ................. G06F 3/0647 711/165 |
| 2016/0006673 A1 | 1/2016 | Thomas et al. |
| 2016/0026409 A1 * | 1/2016 | Tanaka ............... G06F 12/0866 711/120 |
| 2016/0105370 A1 | 4/2016 | Mellor et al. |
| 2016/0202693 A1 | 7/2016 | Noda et al. |
| 2016/0306822 A1 * | 10/2016 | Waghulde ......... G06F 17/30212 |
| 2016/0335550 A1 | 11/2016 | Achin et al. |
| 2016/0342486 A1 | 11/2016 | Kedem et al. |
| 2017/0351543 A1 | 12/2017 | Kimura |
| 2017/0371887 A1 * | 12/2017 | Balasubrannanian ..................... G06F 17/30091 |
| 2018/0075069 A1 | 3/2018 | Guim et al. |

* cited by examiner

DATA LAYOUT SCHEMAS FOR SEAMLESS DATA MIGRATION

TECHNICAL FIELD

The present disclosure relates to storing objects in a storage system. In particular, the present disclosure relates to migrating data from one storage location to another storage location.

BACKGROUND

Storage systems store objects according to various corresponding storage architectures. Examples of storage architectures include an object storage, a file system, a block storage, and/or a database.

Each object within a storage system is associated with data and metadata. Data (also referred to herein as "object data") includes, for example, information that is used by an end user and/or a client application. As an example, data for a Sales Application may include information about customers, products, and sales. As another example, data for a Human Resources Application may include information about employees, departments, and salaries. Metadata describes how the data is set up and/or stored. Additionally or alternatively, metadata describes characteristics about the data itself. Metadata may be used to manipulate and/or manage the objects in a storage system.

In cloud computing environments, data migration may happen for a variety of reasons. For example, policy-based tiering may trigger migration to match the cost and quality-of-service (QoS) expectations of cloud service subscribers. If a cloud user upgrades or downgrades the service, data may be moved from one storage tier to another storage tier to satisfy storage and capacity demands. Other policies may migrate data from a primary storage tier to an archival tier to reduce the storage overhead of older and less frequently accessed data.

Geo-replication and geo-location policies are another example of automated data migration rules. Geo-replication and geo-location policies trigger migration of data based on the location of cloud service subscribers. Data may be moved from one geographic location to another geographic location if the cloud user moves or expands to a different geographic location. Migrating data to be geographically closer to a user may decrease access times, improve network performance, and reduce storage costs.

In other examples, data may be migrated due to updated storage infrastructure. New storage offerings may reduce costs, improve performance, and render old storage technology obsolete. Cloud administrators may migrate customer data from older to newer storage technology to improve the performance of cloud service offerings provided to subscribers.

Data migration presents several challenges within the cloud environment. One challenge is that customers often expect uninterrupted access to data under a single global namespace. One approach to providing a global namespace is to maintain a mapping between object names and physical storage locations within a metadata tier of a storage system. If data within a data tier is migrated from one physical storage location to another, then the storage system updates the physical storage location of each migrated data object within the metadata tier. Thus, the same object name is mapped to the new storage location, thereby maintaining the same namespace before and after data migration. However, updating the location pointer in the metadata tier whenever data migration occurs puts a great amount of load on the metadata tier when the migration involves a large amount of data. As a result, requests requiring access to the metadata tier may suffer severe performance degradation as large data migrations are ongoing.

Another challenge of data migration is that the physical layout of data may not be consistent across different storage tiers. For example, frequently accessed data may be stored on hard disk while older data may be migrated to tapes. The different storage formats add to the complexity of servicing requests to access the data as the data is being migrated. Further, the different storage formats may increase the load on the metadata tier during migration as the location pointers stored within the metadata tier are updated to the new storage format.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
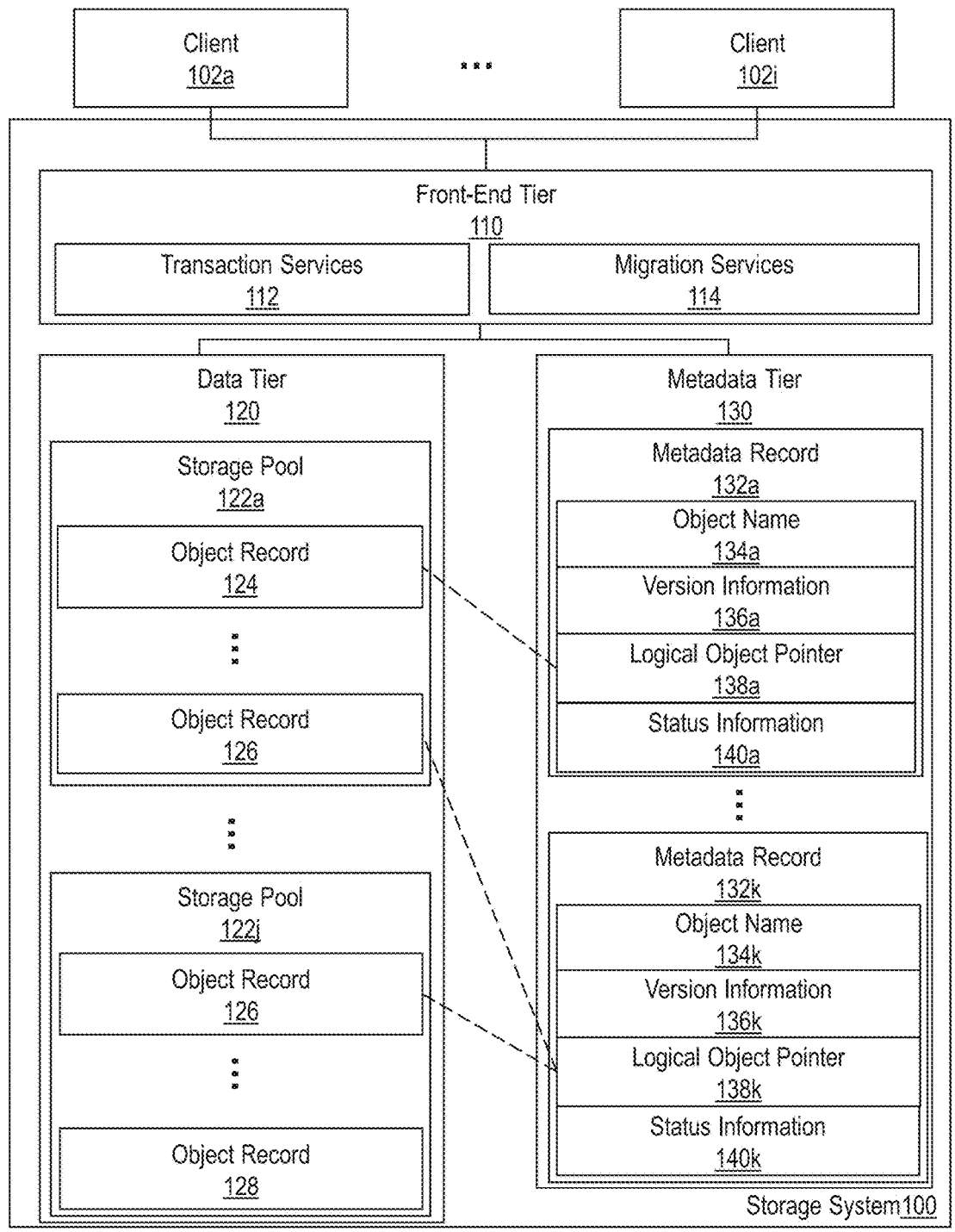
FIG. 1 illustrates an example storage system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. STORAGE SYSTEM ARCHITECTURE
3. DATA LAYOUT SCHEMAS FOR STORAGE AND MIGRATION
4. HARDWARE OVERVIEW
5. MISCELLANEOUS; EXTENSIONS

1. GENERAL OVERVIEW

Data migration may result in a ripple effect through a storage system that significantly degrades performance. For example, if a set of data objects are migrated from one storage location to another storage location, each of these storage components may suffer from a significant increase in load as the data is being extracted from the source storage component and loaded into the destination storage component. Performance degradation may also extend to a metadata server that stores location information for the object data that is being migrated. If the metadata server (MDS) stores location pointers that map directly to the storage components, then the location pointer for each object is also updated. With large scale migrations, this may result in millions or more location pointers being updated within the MDS.

According to techniques described herein, large-scale migrations may be performed with minimal impact on an MDS. In one or more embodiments, logical object pointer is maintained within a metadata tier of a storage system. A logical object pointer in this context points to a logical storage location of an object rather than a physical storage location. In the event that the data object is migrated from a source to a destination storage component, the logical object pointer may remain unchanged. Before migration, the logical storage location is mapped to a physical storage location in the source storage component. During migration, the logical object pointer may be mapped to both a physical storage location in the source storage component and a physical storage location in the destination storage component. After migration is complete, the logical object pointer is mapped to the physical storage location in the destination storage component. Thus, migration may be achieved with minimal or no updates to the logical pointer stored within the metadata tier.

Techniques described herein further provide for uninterrupted access to data that is being migrated from a source storage component to a destination storage component. While migration is ongoing, for instance, a storage system may receive a request to access a data object. If the request is to perform a write operation, then the storage system executes the write request on the destination storage component without executing the write request on the source storage component. Thus, the overhead associated with updating an obsolete storage location may be avoided. If the request is to perform a read operation, then the storage system may select the source and/or the destination storage component to execute the read request.

In order to select a storage component to execute a read request, a storage system may account for various factors. For example, the storage system may select the storage component based on one or more attributes associated with the source and/or destination storage component. Example attributes may include, but are not limited to, storage media type, input/output (I/O) speeds, location, transaction load, and/or other performance characteristics. The storage system attributes may be used to optimize execution time of the read request while minimizing load within the data tier.

2. Storage System Architecture

FIG. 1 illustrates example storage system 100 in accordance with one or more embodiments. As illustrated in FIG. 1, system 100 includes front-end tier 110, data tier 120, and metadata tier 130. In one or more embodiments, storage system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, data tier 120 and/or metadata tier 130 are implemented using one or more data repositories. A data repository is any type of storage unit and/or device (e.g., a file system, database, collection of tables, disk, tape cartridge, or any other storage mechanism) for storing data. Further, a data repository may include multiple different storage units and/or devices. The multiple different storage units and/or devices may or may not be of the same type or located at the same physical site. Further, a data repository may be implemented or may execute on the same computing system as front-end tier 110. Alternatively or additionally, a data repository may be implemented or executed on a computing system separate from front-end tier 110. A data repository may be communicatively coupled to front-end tier 110 via a direct connection or via a network. Different tiers may transmit messages and data to other tiers using one or more network communication protocols, such as communication protocols associated with the Internet Protocol (IP) Suite. In addition or alternatively, different tiers may transmit data using one or more communication protocols for passing messages between components executing on the same host machine, such as issuing function calls, issuing interrupts, and posting work requests in a queue.

In one or more embodiments, data tier 120 comprises hardware and/or software configured to store object data associated with objects of a storage system. As illustrated, data tier 120 includes one or more storage pools (such as storage pools 122*a-j*). A storage pool in this context represents a set of storage components that are grouped together. The grouping may be performed based on common attributes, such as storage media type, geographic location, or any other attribute or combination of attributes. For example a storage pool may correspond to an aggregation of hard disk drive (HDD) storage servers, compute servers, erasure coded storage, tape libraries, etc.

In one or more embodiments, data tier 120 is subdivided into different storage tiers or classes. Example storage tiers/classes may include, but are not limited to:
  (a) a replication tier including one or more storage pools that replicate data over two or more storage devices;
  (b) a disk tier including one or more storage pools comprised of HDD storage servers and/or other physical disk storage components;
  (c) an erasure encoded tier including one or more storage pools that store erasure-encoded data objects; and/or
  (d) an archive tier including one or more storage pools that are used to archive old and/or infrequently accessed data.

As illustrated, storage pools 122*a-j* each store a set of object records (such as object record 124, object record 126, and object record 128). An object record stores object data, such as a binary large object (BLOB), binary file objects (BFILE), executable binaries, and/or user data stored in any other format. In addition, each object record may store object metadata, such as an object name, version number, etc. The object metadata within an object record is stored separately from the object metadata maintained in metadata tier 130.

Objects stored in one storage pool may also be replicated and/or migrated across different storage pools. As illustrated, for example, object record 126 resides in both storage pool 122*a* and storage pool 122*j*. The physical storage format of object record 126 may be different or the same within storage pool 122a and storage pool 122j, depending on the particular implementation. For instance, if storage pool 122a is a HDD server, object record 126 may be stored in HDD blocks. If storage pool 122j is an erasure-encoded server, then object record 126 may be stored in an erasure-encoded format. As another example, if storage pool 122j is a tape library, then object record 126 may be formatted for storage on a tape cartridge.

In one or more embodiments, metadata tier 130 refers to hardware and/or software configured to store metadata associated with objects of a storage system. As illustrated, metadata tier 130 includes one or more metadata records (such as metadata records 132a-k). Metadata records 132a-k store object metadata for corresponding data objects stored within data tier 120. The object metadata includes the object name (such as object names 134a-k), version information (such as version information 136a-k), a logical object pointer (such as logical object pointers 138a-k), and status information (such as status information 140a-k).

Object names 134a-k may be any value such as a sequence of alphanumeric characters assigned to an object as a label or identifier. Object names 134a-k may be chosen by a user, a storage client, or storage system 100 depending on the particular implementation. An object having a particular object name may be associated with one or more versions. The one or more versions of the object may be stored within a single storage pool and/or replicated across different storage pools within data tier 120.

Version information 136a tracks different versions of an object stored within storage system 100. In one or more embodiments, metadata records 132a-k include metadata corresponding to a particular version of object data of an object. Each time a new object is created, a new metadata record is generated for storing the metadata of the object. Each time the object data of an object is changed, the metadata record may be updated and/or a new version-specific metadata record may be generated for storing the metadata associated with the new object data of the object.

Each time the metadata corresponding to a particular version of object data of an object is changed, the existing metadata record for the particular version of object data is overwritten with new metadata. The metadata may change due to a user request and/or a system request. User requests may be received from a user via a user interface and/or application programming interface (API). System requests may be received from an application and/or a process. As an example, metadata associated with an object may include a flag indicating whether a transaction event record of the object has been published. After publishing a particular transaction event record, a publisher may request that the flag associated with the particular transaction event record become marked. The request from the publisher is an example of a system request to modify the metadata of the object.

In one or more embodiments, metadata records 132a-k each include a respective logical object pointer (logical object pointers 138a-k). A logical object pointer in this context identifies a logical storage location within data tier 120 where a corresponding object record is stored. For instance, logical object pointer 138a identifiers a logical storage location for object record 124, and logical object pointer 138k points to object record 126.

In one or more embodiments, a logical object pointer points to a single logical storage location. The logical storage location may be mapped to one or more physical storage locations. For example, logical object pointer 138k may point to a single logical storage location within data tier 120 where object record 126 is stored. Object record 126 may be stored in multiple physical storage locations, allocated from storage pool 122a and 122j, due to an ongoing migration or replication. The logical storage location for object record 126 may be mapped to each physical storage location where object record 126 is stored within data tier 120.

In the event of a migration or replication event, the logical storage location of an object record does not change in accordance with one or more embodiments. By maintaining the same logical storage location, logical object pointers 138a-k are still valid before and after migration without any updates. Thus, the processing load on metadata tier 130 may be greatly reduced.

In one or more embodiments, each of metadata records 132a-k maintains status information about a corresponding object and/or version of the object. For example, status information 140a may track whether object record 124 is an active/committed version of an object, pending an update, marked for deletion, etc. Similarly, status information 140k may track the status of object record 126. Transaction services 112 may update status information 140a in response to write and/or other operations that modify object data. As previously indicated, data migrations and replication may be performed with minimal or no updates to metadata records 132a-k. Thus, large-scale migrations have little to no impact on transactional operations (such as creating new metadata records and overwriting existing metadata records) that read and write data to metadata tier 130.

In one or more embodiments, front-end tier 110 is communicatively coupled or otherwise configured to receive requests from clients 102a-i. Clients 102a-i represent processes, applications, or other users for which storage system 100 stores data. For example, clients 102a-i may include, but are not limited to, one or more instances of a database server, application server, middleware application or some other resource. In the context of a cloud environment, clients 102a-i may correspond to a database-as-a-service (DBaaS), software-as-a-service (SaaS), platform-as-a-service (PaaS), a cloud tenant/user, or any other cloud resource. Clients 102a-i may reside locally or be remote from storage system 100.

In one or more embodiments, front-end tier 110 comprises hardware and/or software configured to expose a user interface and/or an application programming interface (API) for receiving requests. The API may conform to a Representational State Transfer (REST) architectural style. The commands exposed to clients 102a-i through the API may include but are not limited to:

(a) storing object data and/or metadata for an object;
    (b) reading object data and/or metadata for an object;
    (c) deleting object data and/or metadata for an object; and
    (d) migrating object data and or metadata for an object between different storage locations.

In one or more embodiments, front-end tier 110 includes transaction services 112 and migration services 114. Transaction services 112 includes logic for handling transactions on behalf of clients 102a-i. For example, responsive to a request to write an object to storage system 100, transaction services 112 may interact with data tier 120 and/or metadata tier 130 to coordinate a write transaction. Transaction services 112 may monitor the write transaction to determine whether to commit or abort changes within data tier 120 and/or metadata tier 130.

Migration services 114 includes logic for handling data migrations between different storage components. In one or more embodiments, migration services 114 maintains a set of policies that control migration of client data. Example policies may include, but are not limited to:

(a) Container policies configured by clients to drive the movement based on the age of the data;

(b) System policies configured by the storage provider to drive movement of the data based on the age of the underlying storage technology; and (c) Durability and availability policies configured by the system administrator (such as a cloud service provider) to ensure that service-level agreements (SLAs) with cloud service consumers are satisfied.

In one or more embodiments, migration services 114 includes a set of processes for extracting data from a source storage component and loading the data to a destination storage component. The extraction and loading processes may map data from the destination storage component to the source storage component. If the source and destination storage components have different physical layouts, then migrations services 114 may relate the source format to the new format in the destination storage component. For example, during migration from disk to tape, migration services 114 may map hard disk data blocks to a tape cartridge where the blocks were migrated.

In one or more embodiments, migrations services 114 includes logic for migrating data within data tier 120 without changing location information for the migrated data objects in metadata tier 130. As previously mentioned, the logical storage location may remain the same both before and after migration of a data block. The underlying physical storage component to which the logical storage location is mapped may be changed. However, these changes may be made within data tier 120 without modifying the logical object pointer and metadata records within metadata tier 130.

In one or more embodiments, front-end tier 110 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, a personal digital assistant ("PDA").

3. Data Layout Schemas for Storage and Migration

A. Volumes

In one or more embodiments, a logical storage unit referred to as a volume is allocated from a storage pool. A volume in this context represents a slice of underlying capacity within a storage pool. Multiple volumes may be allocated from a single storage pool depending on the total storage capacity of the storage pool and the size of each volume, which may vary from implementation to implementation.

In one or more embodiments, object data is encapsulated in a volume. For example, BLOBs may be encapsulated in a volume as a bit-stream, where the bit stream is physically stored as bits or captured in a trained executable. A bit-stream or other object data encapsulated in the volume may be retrieved by directly reading the physical storage location or by executing the trained executable stored at the storage location.

Figure 2A:
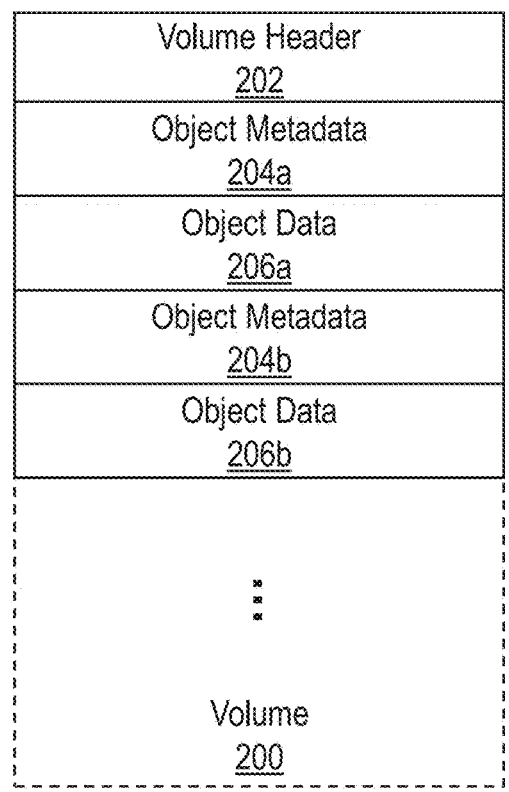
FIG. 2A illustrates an example volume schema in accordance with one or more embodiments.

In one or more embodiments, the structure of a volume includes both data and metadata. FIG. 2A illustrates an example schema for volume 200 in accordance with one or more embodiments. The schema for volume 200 includes volume header 202, object metadata (such as object metadata 204*a-b*), and object data (such as object data 206*a-b*). Volume 200 bin-packs data for multiple objects into a single logical unit of migration. The number of objects that are bin-packed into a single volume may vary from implementation to implementation depending on the storage capacity allocated to the volume.

In one or more embodiments, each respective object stored within volume 200 is associated with a unique identifier. For example, the unique identifier may be a combination of the volume identifier and an offset, where the volume identifier is a value (such as an alphanumeric sequence) that uniquely identifies a volume within storage system 100 and the offset is a value that identifies the beginning of the object data in a volume bit-stream.

In one or more embodiments, the offset is a logical entity that represents the location of object data in space or time. When the offset is a logical construct, a mapping table may be embedded in the volume. For instance, the mapping table may be stored within volume header 202 or some other predefined location within the volume. For space offsets, the embedded mapping table maps logical offsets to physical offsets. A space offset of "500" may map to 500 megabytes (MB) in one physical storage component and one gigabyte (GB) in another storage component. For time offsets, the embedded mapping table maps logical offsets to time codes or a time index.

In one or more embodiments, the offset indicates the location of an object record with respect to the beginning of the volume. For instance, if object record 124 is stored within a volume denoted "V5" at an offset of 500, the offset may indicate that the object record is the 500th record in the volume or that the object is located 500 logical storage units from the beginning of the volume. A value of "V5: 500" may be used to uniquely identify the object within storage system 100. The unique identifier may be assigned to logical object pointer 138*a* within metadata record 132*a*.

A unique identifier assigned to a version of an object may be used by any tier within storage system 100 to interface with storage pools 122*a-j* and access the corresponding object data. For example, front-end tier 110 may use logical object pointer 138*a* to read, write, or otherwise access object record 124. Metadata tier 130 may also use logical object pointer 138*a* to interface with storage pool 122*a* and access object record 124.

In one or more embodiments, the volume identifier and offset assigned to an object do not change if the volumes are migrated or replicated. For example, logical object pointer 138*k* may have a value of "V1:600" meaning object record 126 is stored in a volume with the volume identifier "V1" at an offset of 600. Initially, the volume "V1" may be stored only in storage pool 122*a*. The volume may then be migrated or replicated to storage pool 122*j*. During and after migration, logical object pointer retains the same value of "V1: 600" and is not changed. The logical object pointer may remain constant as the logical structure and format of the volume does not change. Even though the logical constructs of the volume remain constant, the underlying physical structure and format of the stored object data may change.

B. Physical Layout Mappings

Within data tier 120, volumes may be migrated and/or replicated between different storage tiers, locations, and storage technologies. When a volume is migrated from one storage component to another storage component, the physical layout of the data may change. For example, migrating the data from an HDD server to an erasure-encoded server may involve transforming data in disk blocks into an erasure-encoded format. As another example, migrating data from an HDD server to a tape may involve formatting the data for storage on a tape cartridge.

In one or more embodiments, a volume is associated with one or more layout representations. A layout representation in this context is a set of data that represents the topology of an underlying physical storage. For example, a layout may include a mapping to disk blocks, extents, tape cartridges, physical storage addresses, or any other media-specific storage location information. In addition or alternatively, a layout may represent logic that is used to regenerate object data on request. For example, the layout may be a stored executable that, upon execution, generates an object record. A logical offset may thus be an executable that generates the object data or an index into a logical-to-physical mapping table as previously described.

Figure 2B:
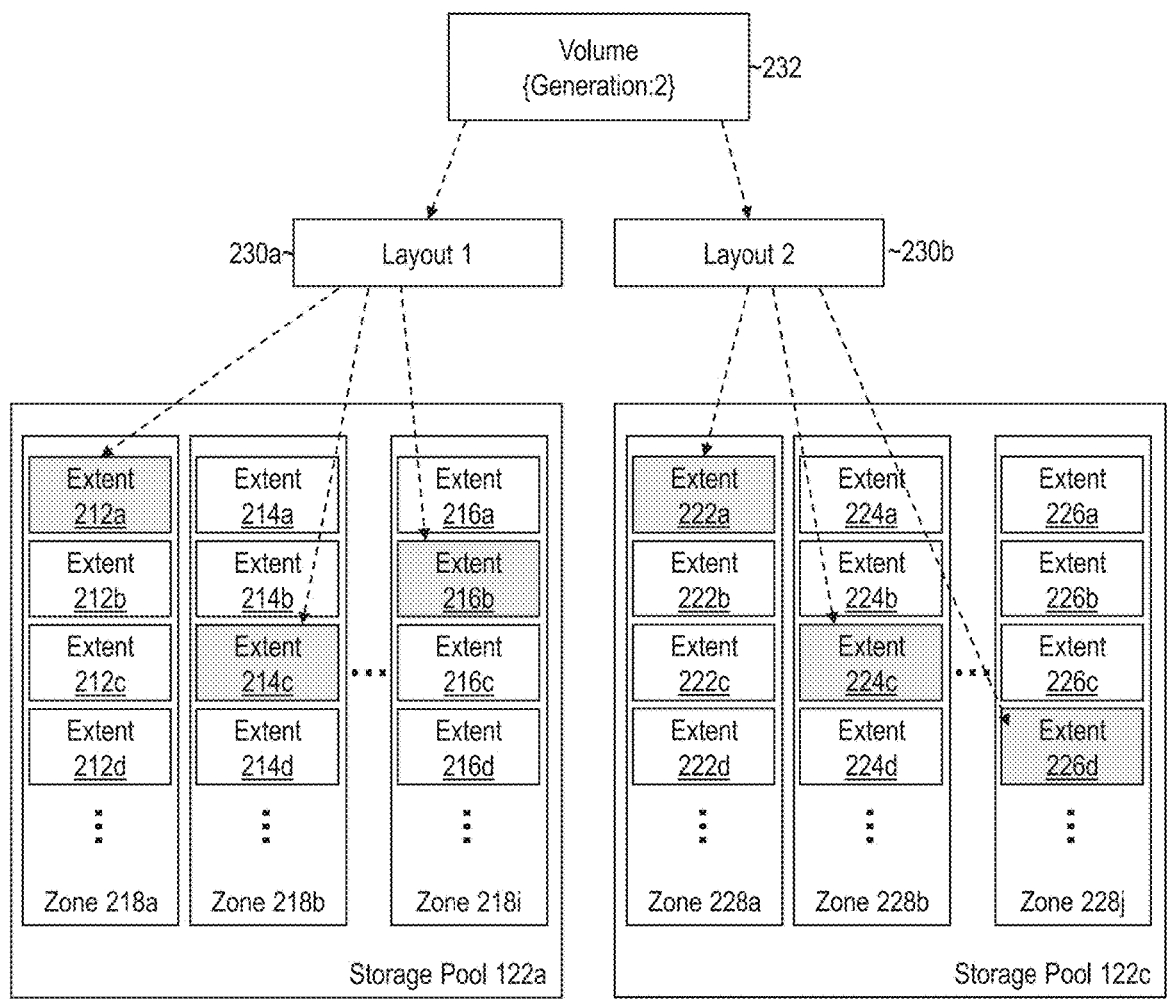
FIG. 2B illustrates an example set of layout representations within a volume in accordance with one or more embodiments.

FIG. 2B illustrates an example set of layout representations within a volume in accordance with one or more embodiments. As previously illustrated, volume 232 is associated with two separate layouts. Layout 230a is mapped to a set of extents within storage pool 122a, including extent 212a, extent 214c, and extent 216b, on which volume 232 is stored. Layout 230b is mapped to a different set of extents within storage pool 122c, including extent 222a, extent 224c, and extent 226d, on which the volume is also stored. An "extent" in this context refers to a contiguous block of physical storage. As previously mentioned, in other embodiments layouts may be mapped to other forms of physical storage, such as tape cartridges disk blocks, etc., depending on the underlying format of the storage media.

Storage pool 122a and storage pool 122c include multiple extents distributed across a plurality of zones. Within storage pool 122a, zone 218a includes extents 212a-d, zone 218b includes extents 214a-d, and zone 218i includes extent 216a-d. Within storage pool 122c, zone 228a includes extents 222a-d, zone 228b includes extents 224a-d, and zone 228j includes extents 226a-d. A zone in this context may represent a different compute zone, storage area, geographic location, or storage device within a storage pool. As illustrated, a subset of extents distributed across multiple zones may be used to store the object data and metadata within a volume.

Volume 232 includes a version/generation number which tracks updates to the volume. For example, the generation number may be updated each time a new layout is attached to the volume. The generation number may be used to determine the most recent version of volume 232 and to prevent the use of obsolete layouts. New layouts may be generated and attached to a volume during replication and/or migration operations. In addition or alternatively, a new layout representation may also be generated and attached in the event of volume updates. During a volume repair, for instance, an extent may be replaced with another extent within the same storage pool. In response to the update, the generation count of the volume is updated.

In one or more embodiments, multiple layouts may be active at a given point in time. For instance, both layout 230a and layout 230b may be used to store object data within volume 232. Access requests, such as reads and writes, may be directed to either active layout or both, depending on the particular implementation. Techniques for processing read and write requests are discussed in further detail below.

As previously discussed, a single logical object pointer may be mapped to a particular volume identifier and offset. The layout representation may be used to determine the underlying physical storage location for the offset. For example, the logical object pointer "V232:800", pointing to an object record within volume 232 stored at offset 800, may map to a first extent within layout 230a and a second extent within layout 230b. In other examples, the layout may map a logical object pointer to a tape cartridge, data block or some other physical storage location where the corresponding data object is stored.

C. Data Migrations with Minimal Impact on Metadata Tier

In one or more embodiments, a volume is a logical unit of migration. When a volume is migrated, all data objects within the volume are moved from one physical storage component to another physical storage component. For example, if volume 200 is migrated from an HDD server to an archive storage tier, then migration services 114 may extract object metadata 204a-b and object data 206a-206b from the HDD server. Migration services 114 then loads the object metadata and data onto one or more storage components within the storage tier.

In one or more embodiments, the logical format and structure of a volume does not change during migration. By maintaining the same format and structure, the logical object pointers within metadata tier 130 may be maintained without being updated. For example, the unique identifier "V1:500" may be assigned as a logical object pointer for a particular data object. If volume "V1" is migrated, the same logical object pointer may be used to access the data object at the new storage location.

Figure 3A:
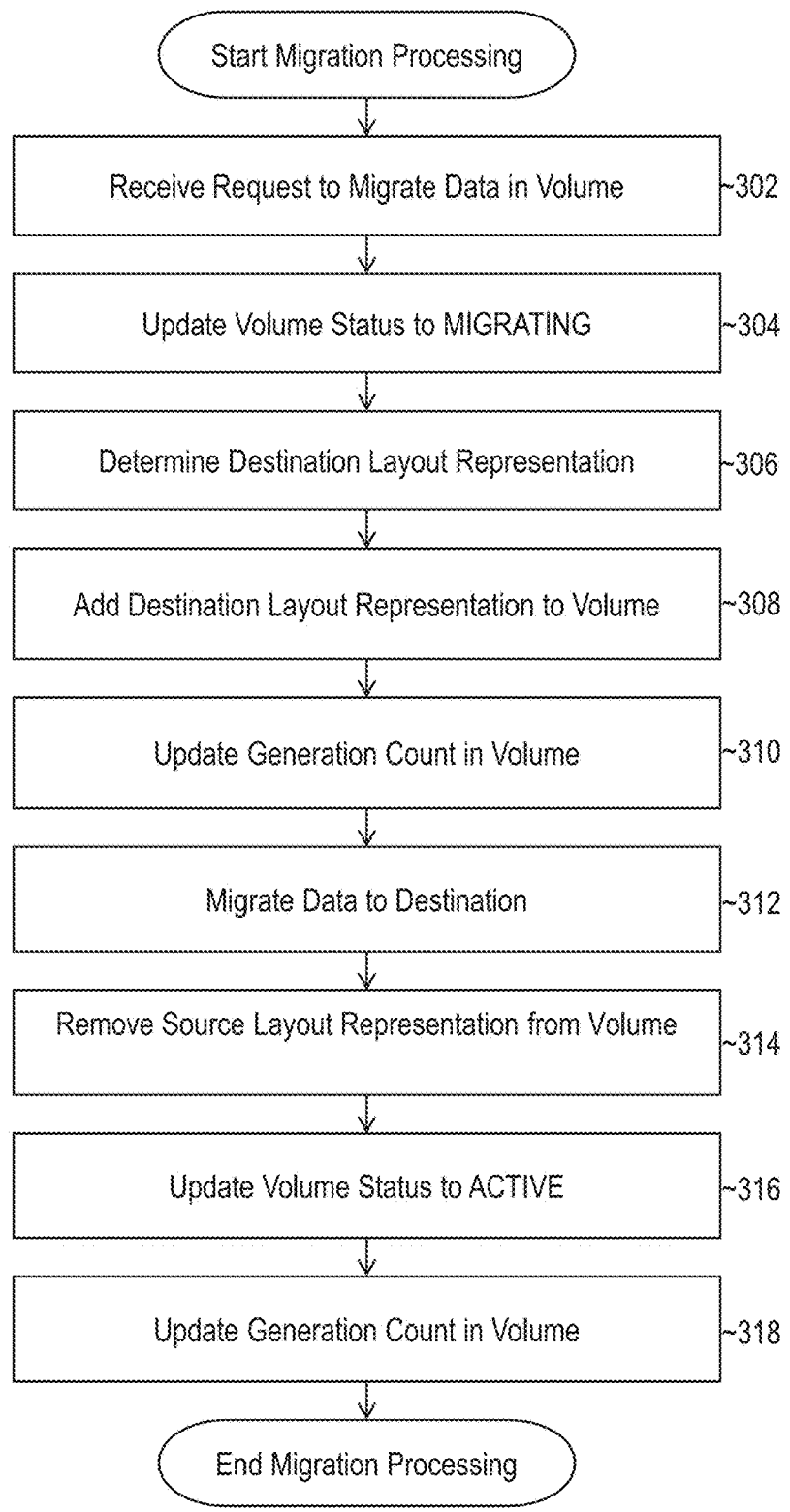
FIG. 3A illustrates an example set of operations for migrating data in accordance with one or more embodiments.

FIG. 3A illustrates an example set of operations for migrating data in accordance with one or more embodiments. The migration process begins with storage system 100 receiving a request to migrate data in a volume (Operation 302). The request may originate from one of clients 102a-i. Alternatively, the request may be triggered by a component within storage system 100 based on a migration policy, such as a container policy, system policy, or durability policy as previously described. For example, volumes that include data older than a certain age may be automatically migrated to an archival tier after the age of the data has reached a threshold.

In response to receiving the request to migrate the data, migration services 114 updates the volume status to MIGRATING (Operation 304). The status of the volume may be maintained within a volume header, such as volume header 202, or some other location within the volume. The status update provides a signal to transaction services 112 that migration is ongoing. Transaction services 112 may handle read and write operations differently for volumes being migrated, as described in further detail in the section below.

As part of the migration process, migration services 114 determines a destination layout representation (Operation 306). The destination layout representation in this context is a representation of the physical topology of the storage component to which the data is being migrated. The destination layout representation may be generated based on the type of storage media of the destination storage component, the amount of data being migrated, and/or the physical format of the data once migrated. In the context where data is migrated to an archive tier, for instance, the destination layout may identify the storage media (such as tape libraries, optical drives, universal serial bus (USB) sticks and other removable media) that have been selected to archive the data. In other examples, the destination layout may identify extents, disk blocks, physical addresses, or other physical storage locations where the volume is stored.

After the destination layout representation has been determined, migration services 114 adds the destination layout representation to the volume (Operation 308). For example, if volume 232 is being migrated from storage pool 122a to storage pool 122j, then layout 230b may be mapped to or otherwise associated with volume 232.

Once the destination layout representation has been added, migration services 114 updates the generation count in the volume (Operation 310). As previously indicated, the generation count tracks the version of the volume. The version of the volume that existed prior to migration becomes obsolete within storage system 100. Thus, read and write operations are directed to the new version of the volume.

Migration services 114 then migrates the data within a volume from a source storage component to a destination storage component (Operation 312). Migration may include extracting object data from the source storage component, formatting the data for storage on the destination storage component, loading the data into the destination storage component, and/or verifying the data was successfully stored on the destination storage component.

After migration is complete, migration services 114 removes the source destination layout representation from the volume (Operation 314). For example, after migration of volume 232 from layout 230a to layout 230b is complete, migration services 114 may remove 230a from volume 232.

Upon removal of the source destination layout representation, migration services 114 also updates the volume from a MIGRATING status to an ACTIVE status (Operation 316).

Migration services 114 then updates the generation count a second time (Operation 318). Once updated, the version that included source storage layout is invalid and no longer used to process requests.

Figure 3B:
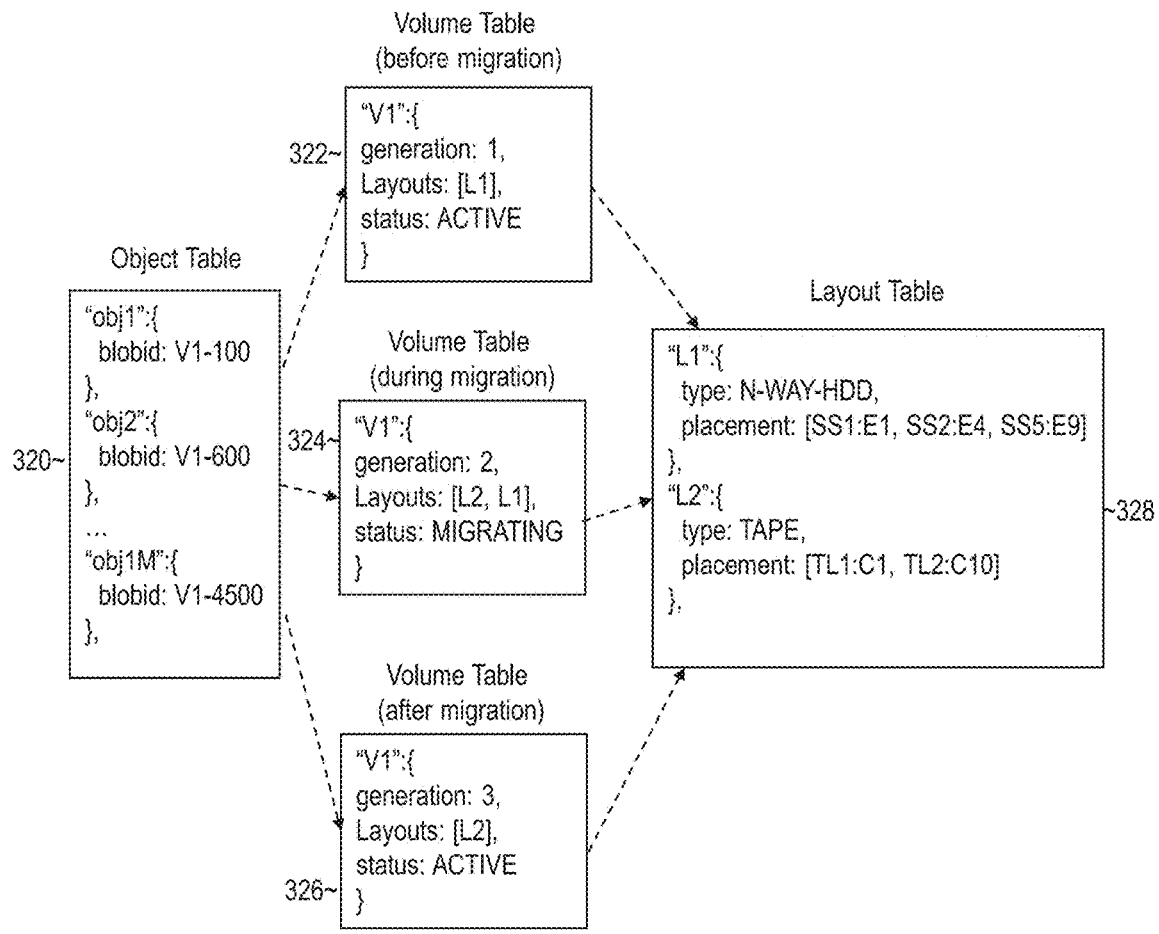
FIG. 3B illustrates an example set of updates to volume data during a migration of data between different storage components.

FIG. 3B illustrates an example set of updates to volume data during a migration of data between different storage components. Object table 320 includes object metadata for millions of objects that point to a single volume (V1). Each object is associated with a logical location pointer (blob id) that is comprised of a combination of a volume identifier (V1) and an offset (100, 600, 4500).

During data migration, a volume table is updated multiple times. The volume table is a data structure that includes (a) a list of layouts which defines the physical location of data, (b) a generation number which is incremented each time the list of layouts is updated, and (c) a status of the volume.

Volume table 322 illustrates the volume table before data migration begins. At this point in time, volume table 322 has a generation count "1", is mapped to layout "L1", and is ACTIVE. Responsive to a request to migrate volume V1 from an HDD server to tape, layout "L2" may be generated and added to the volume table.

Volume table 324 depicts an updated version of volume table 322 after migration has started. The generation count is updated to "2", and the layout "L2" has been added to the table. The status of the table is also updated to MIGRATING.

Volume table 326 depicts an updated version of volume table 324 after migration is complete. As illustrated, the generation count is updated to "3", and the layout "L1" has been removed. The status of the table is updated to ACTIVE.

Layout table 328 defines the physical representation of a volume based on the underlying storage hardware. Layout table 328 defines the type of media and how data is layed out. Layout table 328 further defines the placement of the data, including the addresses of the underlying hardware where the data is located. Layout "L1" in layout table 328 represents a three-way replicated set of storage servers with HDD media. SS1:E1 is a reference to a first storage server, denoted "SS1" and a first extent "E1". Similarly, SS2:E4 is a reference to the fourth extent on a second storage server, and SS5:E9 is a reference to a ninth extent on a fifth storage server. Layout "L2" represents tape media. TL1:C1 maps to a tape library denoted "TL1" and a first cartridge denoted "C1". TL2:C10 refers to the tenth cartridge in a second tape library.

As illustrated in FIG. 3B, the volume table is changed during migration to update the layout representations. However, the migration process does not update the objects table. The pointers within the object table remain unchanged. The same logical object pointer points to "L1" before migration, both "L1" and "L2" during migration, and "L2" after migration.

In one or more embodiments, layouts are ordered within a volume based on recency. For example, layouts may be with the ordered within a volume table with most recent layout on top. Referring to volume table 324, for instance, L2 is placed before L1. As described in further detail below, the order of layouts within the volume table may be used to determine how to perform read and write operations.

D. Transaction Processing During Data Migration

In one or more embodiments, storage system 100 provides uninterrupted access to data during migration. For example, if a volume is being migrated from a source storage component to a destination storage component, clients 102a-i may continue to read and write objects to/from the volume.

In one or more embodiments, write operations are performed on a destination component during migration. For example, if a write operation is received, during the migration process depicted in FIG. 3B, then the object is written to a destination tape library represented by layout "L2". The object is not written to the source HDD servers represented by layout "L1".

During migration, read operations may be directed to the source storage component, the destination storage component, or both. In one or more embodiments, a read is attempted sequentially on layout representations within a volume. With respect to volume table 324, for instance, a read operation may be attempted first on the physical storage component represented by layout "L2". If the data has not been migrated to the destination physical storage component yet or the read is otherwise unsuccessful, then the read operation may be performed on the source storage component represented by layout "L1".

In one or more embodiments, transaction services 112 comprises logic for selecting between the source storage component and the destination storage component based on a set of selection criteria. The selection criteria may account for storage attributes of the source storage component and/or the destination storage component. Example storage component attributes that may be factored into the selection logic may include, but are not limited to:

(a) The type of storage media of the source and/or destination storage component: For example, if the source storage media type has faster access times than the destination storage component, then transaction services may select the source storage component for the read operation. On the other hand, if read operations may be executed more quickly on the destination storage type, then transaction services may attempt a read operation on the destination storage component first.

(b) Input/output (I/O) speeds of the source and/or destination storage components: I/O speeds may be monitored on both the source and destination storage components. Transaction services may perform the read operation on the storage component that has the fastest I/O speeds.

(c) Locality of the source/destination storage component: Transaction services 112 may select the storage component that is closest to the client requesting the read operation.

(d) Transaction load: Transaction services 112 may select the storage component that has the lowest transaction load. For example, if the destination storage component is servicing fewer total requests than the source storage component, then the destination storage component may be selected.

(e) Layout status: The health or status of source and destination layouts may be monitored. A layout may be marked read only, write only, or unreachable. A layout may be unreachable for a variety of reasons such as due to network partitions or failures of the storage servers in the layout. If a destination or source layout is unreachable, then reads may be directed to the other layout.

A combination of attributes including one or more of the above attributes may also be used to select the storage component on which to execute the read operation. For example, each of the attributes may be associated with a weight, and the storage component having the highest total weight may be selected. If the read attempt is unsuccessful on the selected storage component in any of the above scenarios, then the read may be performed on the other storage component.

In one or more embodiments, rather than selecting between the storage or the destination component, read operations may be attempted concurrently on both components. The object data retrieved first may then be returned to the requesting client.

Figure 4:
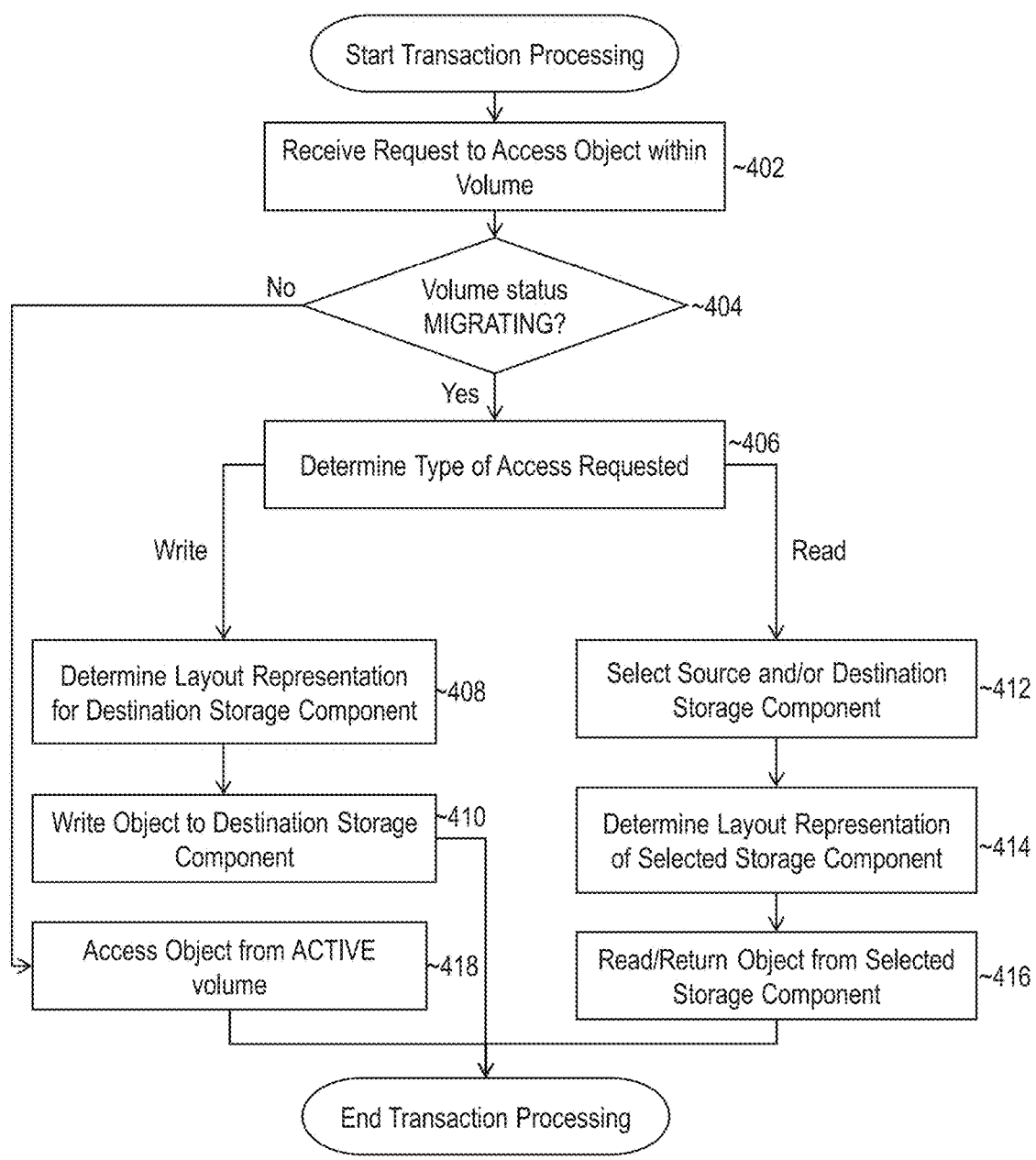
FIG. 4 illustrates an example set of operations for processing client requests in accordance with one or more embodiments.

FIG. 4 illustrates an example set of operations for processing client requests during migration in accordance with one or more embodiments. Transaction processing begins with storage system 100 receiving a request to access an object within a volume. (Operation 402). In one or more embodiments, the request may include a logical object pointer to identify a logical storage location of the object. For example, a client may include the reference "V1:500" to read or write to an object stored at offset 500 within volume "V1".

In response to receiving the request, transaction services 112 determines the status of the volume targeted by the request (Operation 404). For example, transaction services 112 may access a volume table or a volume header for the most current generation of a volume. Transaction services 112 may parse the status entry to determine whether the volume is currently being migrated.

If the object is being migrated, then transaction services 112 determines the type of access requested by the client (Operation 406).

If the request is to perform a write of a new object or new version of an existing object, then transaction services 112 determines a layout representation for the destination storage component (Operation 408). For example, if the request is targeting volume V1, then transaction services may read the layout representations from volume table 324. The destination layout in this instance is "L2", the first layout listed within volume table 324.

Based on the destination layout representation, transaction services 112 writes an object (or a new version of an object) to the destination storage component (Operation 410). The object is not written to the source layout, according to one or more embodiments. Referring again to FIG. 3B, for instance, a write operation to volume "V1" is performed on the physical storage media represented by layout "L2". However, this write operation is not performed on the physical storage media represented by layout "L1".

If the request is to perform a read operation, then transaction services 112 selects the storage and/or destination storage component (Operation 412). The criteria used to perform the selection may vary from implementation to implementation. Example selection logic is provided above.

During a read operation, transaction services 112 determines the layout representation of the selected storage components or set of storage components (Operation 414). For example, if the destination layout is selected, then transaction services 112 may read layout table 328 to determine that layout "L2" is mapped to cartridges "C1" and "C10" within tape library "TL1". If the source layout is selected, then transaction services 112 may determine, from layout table 328, that layout "L1" is mapped to extent "E1" on HDD storage server "SS1", extent "E4" on storage server "SS2", and extent "E9" on storage server "SS5".

Based on the layout representation, transaction services 112 performs a read of the data object from the selected storage component (Operation 416). For example, transaction services 112 may transmit a request to a physical storage device, such as a HDD server or tape library, to retrieve volume data from a physical storage location identified by the layout representation. In response to receiving the data from the physical storage component, transaction services 112 may then return the object data to the requesting client.

The above operations describe example transaction processing during a data migration. If a volume is not being migrated, then transaction services 112 performs the operation on an ACTIVE version of the volume (Operation 418).

As previously mentioned, once migration is complete, the source representation may be removed from a volume. For instance, layout "L1" is removed from volume table 324 in order to generate a new generation of the volume table (volume table 326) after migration. During migration, read requests may target either the source or destination storage components represented by layouts "L1" and "L2", respectively. Read requests received after migration is complete are directed only to the destination storage component "L2" as the source layout representation "L1" has been removed from the volume table. This process allows the volume to be purged from the source storage component after the data has been migrated.

4. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
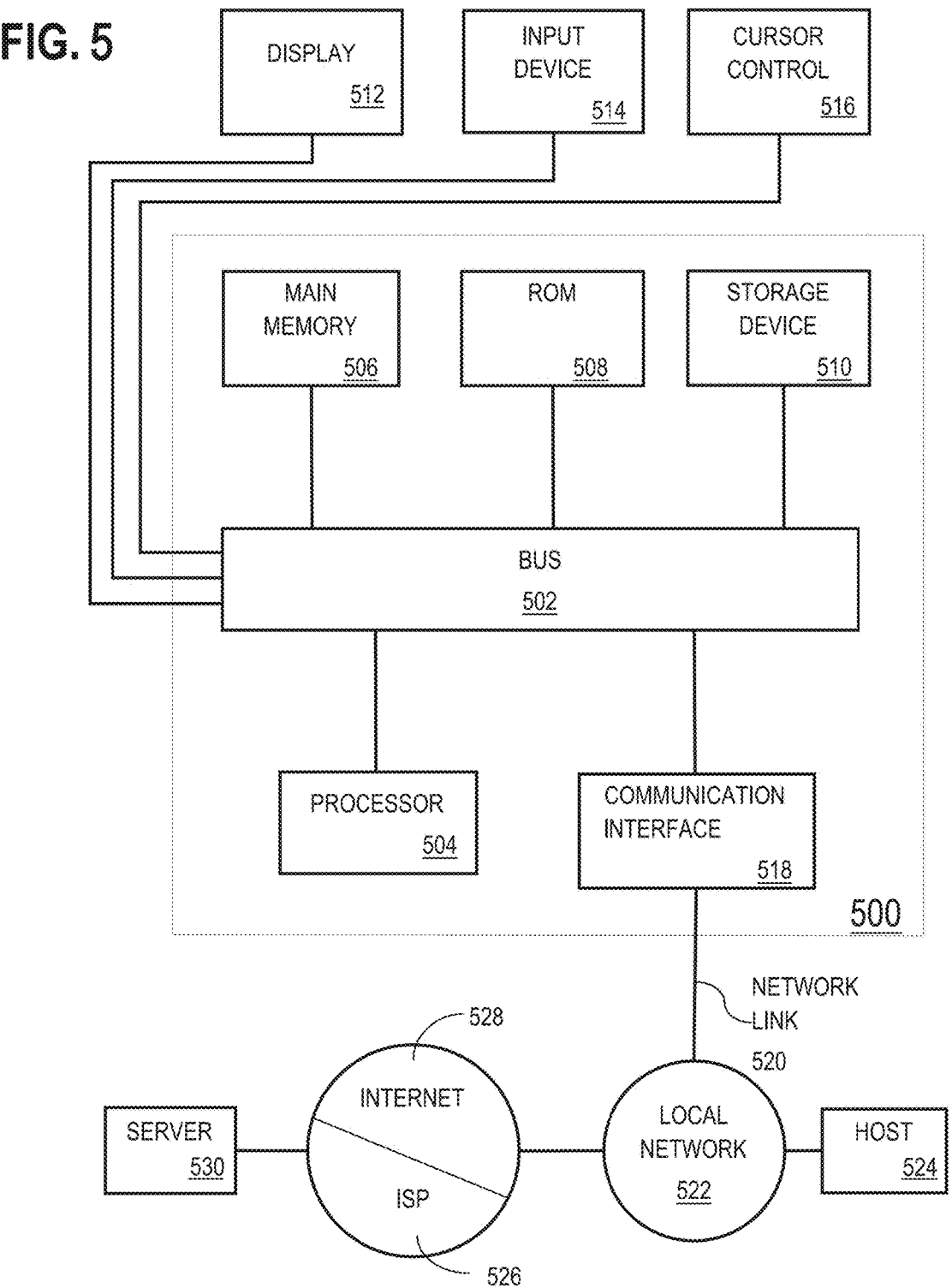
FIG. 5 illustrates an example computer system upon which one or more embodiments may be implemented.

For example, FIG. 5 is a block diagram that illustrates computer system 500 upon which one or more embodiments may be implemented. Computer system 500 includes bus 502 or other communication mechanism for communicating information, and hardware processor 504 coupled with bus 502 for processing information. Hardware processor 504 may be, for example, a general purpose microprocessor.

Computer system 500 also includes main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes read only memory (ROM) 508 or other static storage device coupled to bus 502 for storing static information and instructions for processor 504. Storage device 510, such as a magnetic disk or optical disk, is provided and coupled to bus 502 for storing information and instructions.

Computer system 500 may be coupled via bus 502 to display 512, such as a cathode ray tube (CRT), liquid crystal display (LCD), or light-emitting diode (LED), for displaying information to a computer user. Input device 514, which may include physical and/or touchscreen based alphanumeric keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to host computer 524 or to data equipment operated by Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, server 530 might transmit a requested code for an application program through Internet 528, ISP 526, local network 522 and communication interface 518.

The received code may be executed by processor 504 as it is received, and/or stored in storage device 510, or other non-volatile storage for later execution.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions which, when executed by one or more hardware processors, cause performance of operations comprising:
    storing, within a metadata tier of a storage system, a metadata record that points to a data object that is stored within a first storage component;
    receiving a first request to migrate data from the first storage component to a second storage component;
    responsive to the first request, initiating a migration of the data from the first storage component to the second storage component;
    wherein while migration is ongoing and without updating the metadata record, the metadata record points to the data object in both the first storage component and the second storage component;
    wherein after migration has terminated and without updating the metadata record, the metadata record points to the data object in the second storage component.

2. The one or more non-transitory computer-readable media of claim 1, the operations further comprising:
    while migration is ongoing, receiving a second request to access the data:
        determining whether the second request is a write request or a read request;
        responsive to determining that the second request is a read request, selecting one of the first storage component or the second storage component to execute the read request based on both a first attribute associated with the first storage component and a second attribute associated with the second storage component.

3. The one or more non-transitory computer-readable media of claim 2, wherein the first attribute is one of a type of storage media of the first storage component, an input/output speed of the first storage component, or a locality of the first storage component; and wherein the second attribute is one of a type of storage media of the second storage component, an input/output speed of the second storage component, or a locality of the second storage component.

4. The one or more non-transitory computer-readable media of claim 2, wherein the first storage component is a different type of storage media than the second storage component; wherein selecting one or more of the first storage component or the second storage component to execute the read request is performed based on at least one of which type of storage media has faster access times, which storage component is at a closer location to a client from which the second request originated, or which storage component has a higher transaction load.

5. The one or more non-transitory computer-readable media of claim 1, wherein the data object is stored in a first physical layout within the first storage component and a second physical layout within the second storage component; wherein the first physical layout is different than the second physical layout.

6. The one or more non-transitory computer-readable media of claim 1, wherein before the migration of the data from the first storage component to the second storage component, the data object within the data is associated with a volume identifier for a volume and an offset identifying a logical location of the data object within the volume; wherein a format for the volume remains unchanged after migration; wherein the volume identifier and offset for the data object remain unchanged after the migration of the data from the first storage component to the second storage component is complete.

7. The one or more non-transitory computer-readable media of claim 6, wherein the volume includes a plurality of data objects; wherein during migration of the data from the first storage component to the second storage component, each data object included in the volume is migrated.

8. The one or more non-transitory computer-readable media of claim 6, wherein during migration, the logical location of the data object is associated with a plurality of physical storage locations including a first physical storage location within the first storage component and a second physical storage location on the second storage component.

9. The one or more non-transitory computer-readable media of claim 1, the operations further comprising storing a logical offset for the data object within the data, wherein the logical offset is one of an executable program or an index to a mapping table that maps the logical offset to a first physical address on the first storage component and a second physical address on the second storage component.

10. The one or more non-transitory computer-readable media of claim 1, the operations further comprising: storing, for the data object included in the data, a value that maps to a plurality of layout structures including a first layout structure and a second layout structure, the first layout structure representing a first topology for the first storage component, the second layout structure representing a second topology for the second storage component; wherein the first topology is different than the second topology.

11. The one or more non-transitory computer-readable media of claim 10, the operations comprising: determining a physical storage address for writing new data or reading the data based on the second layout structure representing a second topology for the second storage request.

12. The one or more non-transitory computer-readable media of claim 1, the operations further comprising: storing an object table that maps a plurality of object identifiers to different respective offsets of a particular volume; storing a volume table for the particular volume, the volume table mapped to a set of one or more layout representations; storing a layout table that maps each layout representation in the set of one or more layout representations to one or more physical storage locations.

13. The one or more non-transitory computer-readable media of claim 1, wherein the data is stored in a volume; wherein the first storage component and the second storage component are different types of storage media with different physical layouts for the data, wherein a format of the volume does not change after the data is migrated from the first storage component to the second storage component.

14. A method comprising:
  storing, within a metadata tier of a storage system, a metadata record that points to a data object that is stored within a first storage component;
  receiving a first request to migrate data from the first storage component to a second storage component;
  responsive to the first request, initiating a migration of the data from the first storage component to the second storage component;
  wherein while migration is ongoing and without updating the metadata record, the metadata record points to the data object in both the first storage component and the second storage component;
  wherein after migration has terminated and without updating the metadata record, the metadata record points to the data object in the second storage component.

15. A system comprising:
  one or more hardware processors;
  one or more non-transitory computer readable media storing instruction which, when executed by the one or more hardware processors cause operations comprising:
    storing, within a metadata tier of a storage system, a metadata record that points to a data object that is stored within a first storage component;
    receiving a first request to migrate data from the first storage component to a second storage component;
    responsive to the first request, initiating a migration of the data from the first storage component to the second storage component;
    wherein while migration is ongoing and without updating the metadata record, the metadata record points to the data object in both the first storage component and the second storage component;
    wherein after migration has terminated and without updating the metadata record, the metadata record points to the data object in the second storage component.

16. The system of claim 15, the operations further comprising:
  while migration is ongoing, receiving a second request to access the data:
    determining whether the second request is a write request or a read request;
  responsive to determining that the second request is a read request, selecting one of the first storage component or the second storage component to execute the read request based on both a first attribute associated with the first storage component and a second attribute associated with the second storage component.

17. The system of claim 16, wherein the first storage component is a different type of storage media than the second storage component; wherein selecting one or more of the first storage component or the second storage component to execute the read request is performed based on at least one of which type of storage media has faster access times or on which storage component is at a closer location to a client from which the second request originated.

18. The system of claim 15, wherein the data object is stored in a first physical layout within the first storage component and a second physical layout within the second storage component; wherein the first physical layout is different than the second physical layout.

19. The system of claim 15, wherein before the migration of the data from the first storage component to the second storage component, the data object within the data is associated with a volume identifier for a volume and an offset identifying a logical location of the data object within the volume; wherein a format for the volume remains unchanged after migration; wherein the volume identifier and offset for the data object remain unchanged after the migration of the data from the first storage component to the second storage component is complete.

20. The system of claim 19, wherein the volume includes a plurality of data objects; wherein during migration of the data from the first storage component to the second storage component, each data object included in the volume is migrated.

* * * * *

UNITED STATES PATENT AND TRADEMARK OFFICE
CERTIFICATE OF CORRECTION

PATENT NO. : 10,275,177 B2
APPLICATION NO. : 15/339299
DATED : April 30, 2019
INVENTOR(S) : Sawhney et al.

It is certified that error appears in the above-identified patent and that said Letters Patent is hereby corrected as shown below:

In the Specification

In Column 6, Line 54, delete "and or" and insert -- and/or --, therefor.

In the Claims

In Column 19, Line 38, in Claim 15, delete "component:" and insert -- component; --, therefor.

Signed and Sealed this
Fourth Day of August, 2020

Andrei Iancu
*Director of the United States Patent and Trademark Office*